Patented Sept. 23, 1952

2,611,755

UNITED STATES PATENT OFFICE 2,611,755

PREPARATION OF STABLE POLYVINYL BUTYRAL DISPERSIONS

William H. Bromley, Jr., West Springfield, Mass., assignor to Shawinigan Resins Corporation, Springfield, Mass., a corporation of Massachusetts No Drawing. Application October 7, 1949, Serial No. 120,223

6 Claims. (Cl. 260—29.6)

This invention relates to stable aqueous dispersions of polyvinyl butyral dispersions and a process for preparing the same.

This application is a continuation-in-part of my copending application, Serial No. 63,630 filed December 4, 1948, now U. S. 2,532,223.

Dispersions of polyvinyl acetal resins are particularly useful in strengthening, bodying and bonding textile fabrics and fibers. The dried films have also found favor in the coating field because of their abrasion resistance and flexibility. Until now, many special fields of application have been closed to these dispersions because of the instability of the dispersion in the presence of some electrolytes, hard water and many of the common fillers and extenders. The dispersions that are unstable under these conditions are generally stabilized with the ammonium or alkali metal salts of long chain fatty acids such as oleic or stearic acids formed in situ. In the presence of some acidic materials, these emulsifying agents lose their effectiveness. It has been though that the use of such acids formed in situ were necessary to form a dispersion by a phase inversion process.

It is the general object of this invention to provide a process for preparing stable aqueous dispersions of polyvinyl butyral. A particular object of this invention is to prepare polyvinyl butyral dispersions which can be compounded or diluted with a wide variety of extenders, fillers and diluents, both alkaline, neutral or acidic.

These and other objects are attained according to this invention by admixing polyvinyl butyral resin, a plasticizer, water and a small amount of an alkyl aryl alkali metal sulfonate, and agitating the mixture until the resin is plasticized. With further mixing, the water becomes finely dispersed throughout the plasticized mass by the action of the detergent, a sufficient amount of water is then added to cause the dispersion to invert to a resin-in-water dispersion.

This process may be carried out in light-weight equipment and with relatively low power consumption. The following examples are illustrative but are not to be construed as indicating the limits of the invention. Where the viscosity of the polyvinyl butyral is specified in the examples, a 7.5% solution of the resin in methanol was measured at 20° C. Where parts are mentioned, they are parts by weight.

Example I 900 parts of 218 centipoise polyvinyl butyral (1.5% acetate groups calculated as polyvinyl acetate, 20% hydroxyl groups calculated as polyvinyl alcohol and the balance polyvinyl butyral groups), 280 parts of water, 76 parts dodecyl benzene sodium sulfonate, and 310 parts of butyl ricinoleate are added to a standard Werner-Pfleiderer mixer equipped with sigma blades. The mixture is heated to about 60° C. and agitated for approximately 10 minutes during which time the resin becomes plasticized. Thereafter, the mixing is continued to completely disperse the water throughout the plasticized mass. 100 parts of water are then added to cause the inversion of the water-in-resin dispersion to a resin-in-water dispersion. About 20 minutes are required to invert the dispersion. 1540 parts of water are then added to reduce the resin-in-water dispersion to 40% solids.

Examination of the product shows that the resin particles are below .5 micron in diameter. Photographs made in electron microscope studies show that the great majority of the particles are below .1 micron in diameter. The viscosity of this dispersion is 400–500 centipoises at 20° C.

The dispersion of this example can be diluted to below 3% solids with hard water (300 p. p. m.) without precipitation of the internal phase. The pH of the diluted dispersion can be reduced below 7.0. This dispersion will tolerate 10 times more magnesium sulfate than a similar dispersion made with potassium oleate.

Example II 60 pounds of 154 centipoise polyvinyl butyral (3% acetate groups calculated as polyvinyl acetate, 16.4% alcohol groups calculated as polyvinyl alcohol and the balance polyvinyl butyral), 27 pounds of triethylene glycol dihexoate, 5.5 pounds of decyl benzene sodium sulfonate and 15 pounds of water are added to a 20-gallon standard Werner-Pfleiderer mixer and processed as described in Example I. This water-in-plasticized-resin-dispersion will invert after the addition of approximately 29.5 pounds of water or at about 67% solids where the detergent and plasticizer are figured as solids. This dispersion can withstand infinite dilution without precipitation.

An air-dried film of this dispersion is perfectly clear and transparent. It has a tensile strength of between 3000 and 3400 pounds per square inch when measured on a film .020 inch thick.

The addition of water solutions of partially hydrolyzed polyvinyl acetate did not disturb the stability of the dispersion.

The ammeter readings during the processing show that less than one horsepower is required per gallon of capacity.

In contrast to prior processes in which the emulsifying agent is formed in situ and which require heavy mixing equipment such as Banbury mixers and rubber rolls, a superior product can be formed following this invention by using lighter equipment.

Numerous variations may be introduced into the process as illustrated by the examples. Thus, in place of butyl ricinoleate and triethylene glycol dihexoate, used as plasticizers in the above examples, other plasticizers for polyvinyl butyral may be used such as dibutoxy ethyl phthalate, castor oil, tricresyl phosphate, methyl ricinoleate, dibutyl phthalate, etc. The amount may be varied from 20% to 40% plasticizer on the solids basis. If more plasticizer is necessary for a particular formulation, it has been found more convenient to add the plasticizer to the finished dispersion rather than to add it to the charge and thereby reduce the capacity of the mixing equipment.

The polyvinyl butyrals which are used in accordance with the invention may vary substantially in their composition. Thus, polyvinyl butyrals may be used which have up to 30% hydroxyl groups by weight, calculated as polyvinyl alcohol, up to 30% ester groups by weight, calculated as polyvinyl ester, and the balance substantially butyraldehyde acetal. Among the preferred embodiments are polyvinyl butyrals containing more than 5% and usually more than 10% hydroxyl groups by weight, but not more than 25% hydroxyl groups, calculated as polyvinyl alcohol.

According to a further embodiment of the invention, the polyvinyl butyral contains 10% to 20% hydroxyl groups by weight, calculated as polyvinyl alcohol, less than 3% acetate groups by weight, calculated as polyvinyl acetate, and the balance substantially butyraldehyde acetal.

The polyvinyl esters from which the polyvinyl butyrals are made may have widely varying degrees of polymerization as evidenced by the viscosities of solutions thereof. For example, polyvinyl acetates may be used which in 1-molar benzene solutions have viscosities of from 5 to 500 or more centipoises at 20° C. Other polyvinyl esters may vary correspondingly.

The ester groups in the polyvinyl butyrals are usually acetate groups but the acetate groups may be wholly or partially replaced by other ester groups such as formate, propionate, butyrate, benzoate, etc.

The amount of alkyl aryl sulfonate used depends upon the application in which the dispersion is to be used. Below one part per 100 parts of polyvinyl butyral, the particle size is too large for some purposes and over 15 parts causes no further reduction in particle size but the excess aids in the stabilization of fillers and extenders. Fillers and modifying agents are recommended for certain applications. Starches, clays, natural gums and synthetic thickeners are used to aid in the application or to vary the characteristics of the product. Decyl or dodecyl naphthalene sodium sulfonate may be substituted for dodecyl benzene sodium sulfonate in Example I. A similar product is obtained in each case.

The water added with the original charge reduces the tenacity of the plasticized resin and also partially plasticizes the polyvinyl butyral. The amount used can be as much as 25% of the solids weight, but between 10% and 18% has been found most suitable. If too much water is added it must be evaporated until the water-in-resin inversion point is reached. This inversion point must be determined for each change in the amount of plasticizer or surface active agent.

The foregoing description is given in illustration and not in limitation of the invention as set forth in the appended claims.

What is claimed is:

1. A process for preparing a stable aqueous dispersion of polyvinyl butyral resin which consists in mixing together at the same time 100 parts of unplasticized polyvinyl butyral made up on a weight basis of not over 30% hydroxyl groups calculated as polyvinyl alcohol, not over 30% ester groups calculated as polyvinyl ester and the balance substantially butyral acetal, 1.0 to 15 parts of an alkyl aryl alkali metal sulfonate, from 5 to 80 parts of a plasticizer for the polyvinyl butyral and an amount of water between 8% and 25% of the solids weight depending upon the amount of plasticizer and alkyl aryl alkali metal sulfonate used, agitating and heating the mixture until the resin is plasticized and a water-in-resin dispersion is formed, and then adding a sufficient amount of water with continued agitation to cause the dispersion to invert to a resin-in-water dispersion.

2. A process as described in claim 1 in which the ester groups are acetate groups.

3. A process as described in claim 1 in which the polyvinyl butyral contains on a weight basis from 5% to 25% hydroxyl groups and less than 3% acetate groups.

4. A process as described in claim 1 in which the alkyl aryl sulfonate is dodecyl benzene sodium sulfonate.

5. A process as described in claim 1 in which the alkyl aryl sulfonate is decyl benzene sodium sulfonate.

6. A process as described in claim 1 in which the aryl sulfonate is decyl naphthalene sodium sulfonate.

WILLIAM H. BROMLEY, JR.

REFERENCES CITED

The following references are of record in the file of this patent:

UNITED STATES PATENTS

| Number | Name | Date |
|---|---|---|
| 2,313,144 | Gomm | Mar. 9, 1943 |
| 2,396,607 | Rogers | Mar. 12, 1946 |
| 2,455,402 | Bromley | Dec. 7, 1948 |

FOREIGN PATENTS

| Number | Country | Date |
|---|---|---|
| 609,099 | Great Britain | Oct. 6, 1948 |

OTHER REFERENCES

Ind. & Eng. Chem., January 1943, page 126.